J. A. GOLLIHER.
CONTROLLING AND CUT-OFF VALVE FOR STEAM LINES.
APPLICATION FILED MAY 9, 1914.
1,144,357.
Patented June 29, 1915.
2 SHEETS—SHEET 1.
Fig. 1.
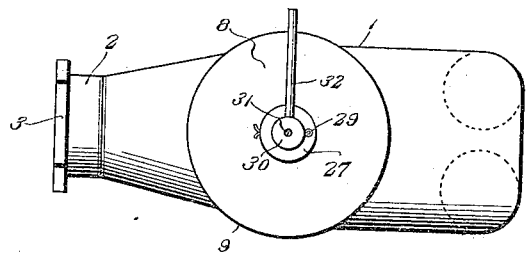
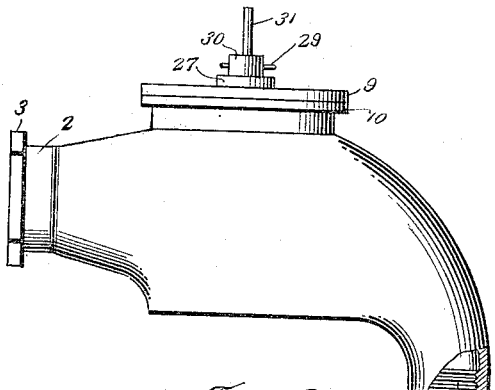
Fig. 2.
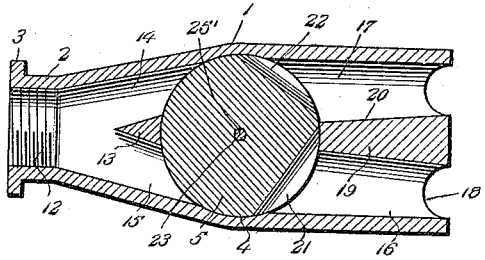
Fig. 3.
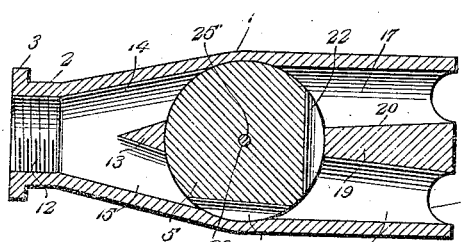
Fig. 4.
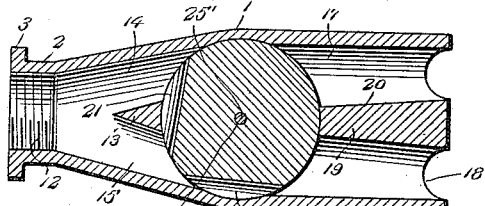
Fig. 5.
Witnesses
Inventor
J. A. Golliher,
By Victor J. Evans
Attorney J. A. GOLLIHER.
CONTROLLING AND CUT-OFF VALVE FOR STEAM LINES.
APPLICATION FILED MAY 9, 1914.

1,144,357.

Patented June 29, 1915.
2 SHEETS—SHEET 2.

Witnesses
J. H. Crawford
C. C. Hines

Inventor
J. A. Golliher,
By Victor J. Evans
Attorney

UNITED STATES PATENT OFFICE.

JOHN A. GOLLIHER, OF FULTON, KENTUCKY.

CONTROLLING AND CUT-OFF VALVE FOR STEAM-LINES.

1,144,357.  Specification of Letters Patent.  Patented June 29, 1915.

Application filed May 9, 1914. Serial No. 837,539.

*To all whom it may concern:*

Be it known that I, JOHN A. GOLLIHER, a citizen of the United States, residing at Fulton, in the county of Fulton and State of Kentucky, have invented new and useful Improvements in Controlling and Cut-Off Valves for Steam-Lines, of which the following is a specification.

This invention relates to a controlling and cut-off valve for steam lines, and particularly to a valve of this character adapted for use on the steam lines of railway cars.

One object of the invention is to provide a valve of the character described which is simple of construction and may be easily and conveniently repaired.

Another object of the invention is to provide a valve which may be employed for blowing off the steam line, to discharge the water of condensation.

Another object of the invention is to provide a valve which may be readily and conveniently adjusted from either the platform or side of the car.

Another object of the invention is to provide a valve which when arranged at the rear of a train can be adjusted to cut-off position, and when arranged at the head of a train may be employed for blowing out the steam line from the head end, so that the responsibility for such work may be placed upon a single attendant, such as the fireman of the engine.

A still further object of the invention is to provide a safety valve which may be applied at each end of a car, so that the valve upon any car in the length of a train may be employed to blow off the water of condensation from both ends, without liability of the train men being scalded, as is liable to happen in detaching hose couplings for the purpose.

A still further object of the invention is to provide a valve which, if generally employed, will reduce delays and avoid liability of the freezing of pipes in cold weather, by allowing the steam line of a train to be drawn off or drained in a ready and expeditious manner.

The invention consists of the features of construction, combination and arrangement of parts herein fully described and claimed, reference being had to the accompanying drawings in which:—

Figure 6:
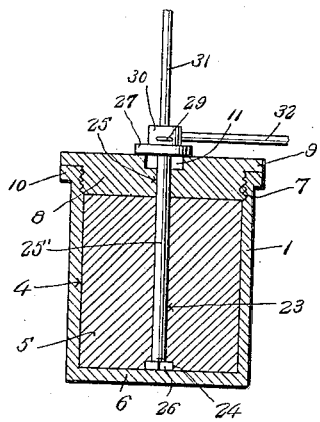
Figure 7:
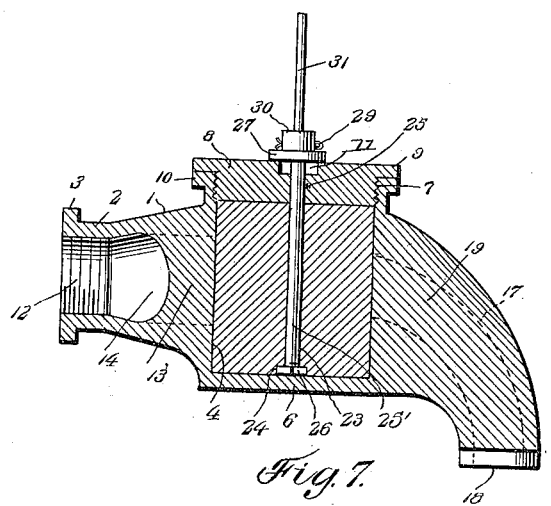
Figure 8:
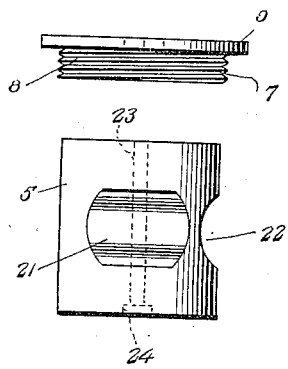
Figure 9:
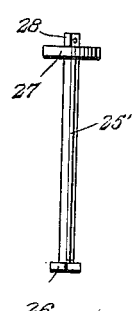
Figure 10:
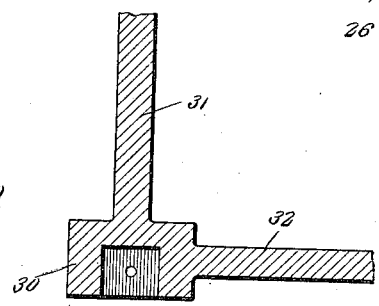

Figure 1 is a top plan view of a combined controlling blow-off valve embodying my invention. Fig. 2 is a side elevation of the same. Figs. 3, 4 and 5 are horizontal longitudinal sections, showing the valve in cut-off, service and blow-out positions, respectively. Fig. 6 is a vertical transverse section through the valve casing. Fig. 7 is a vertical longitudinal section thereof. Figs. 8 and 9 are detail views of the valve and the valve stem. Fig. 10 is a view of the operating handle.

Referring to the drawings, 1 designates the valve casing, which is provided with an inlet end 2 internally threaded for connection with the train line pipe and having an angular head 3 for the application of a wrench, whereby it may be conveniently screwed on and off. Between its end portions the casing is formed with a vertical valve cavity or chamber 4 to receive a rotary plug valve 5. The chamber is closed at its lower end, as shown at 6, and open and internally threaded at its upper end, as shown at 7. A threaded plug 8 is adapted to fit within the threaded upper end 7 of the valve cavity and is formed with a headed or flanged upper end 9 to engage a bearing rim 10 upon the casing, said plug being provided with a socket 11 to receive an angular wrench head, so that it may be easily applied and removed.

The inlet end of the valve casing is formed with an inlet channel 12 which is divided by a partition 13 into side channels 14 and 15, which side or branch channels connect the inlet channel with the valve cavity. The opposite or outlet end of the valve casing is formed with a pair of outlet or discharge channels 16 and 17 in respective alinement with the branch channels 14 and 15, said channels 16 and 17 terminating in outer threaded ends 18 for communication with hose pipes or nipples to which the hose pipes are attached. A partition 19 separates the outlet channels 16 and 17 from each other and its side walls 20 diverge outwardly from the valve cavity, for a purpose hereinafter described.

A valve 5 is formed with a pair of cavities or recesses 21 and 22, arranged in the sides thereof at substantially an angle of 90° with relation to each other, the cavity 21 being of somewhat greater dimensions than the cavity 22. The valve is adapted when arranged in the cut-off position shown in Fig. 3 to blank both passages 16 and 17 and thus cut off the flow of steam. When turned to the position shown in Fig. 4, the cavity 21 connects the inlet channel 12 with the outlet channel 16, while the cavity 22 connects the two outlet channels together, thus providing for the flow of the steam through both outlet channels. When the valve is turned to the position shown in Fig. 5, it cuts off communication between the inlet channel 12 and the outlet channel 17, and opens up direct and exclusive communication between the channel 12 and channel 16 for the blowing out of the steam and water of condensation from the train line. The valve is provided with a longitudinal passage 23 intersecting at its lower end an angular socket 24, and through this passage 23 and a corresponding passage 25 in the plug 8 extends a valve stem 25'. The lower end of the stem is formed with an angular head 26 which fits within the countersink or opening 24, while the upper end of the stem terminates in a head 27 and an angular end portion 28 formed with a perforation to receive a cotter pin 29. The head 26 fitting within the recess 24, couples the valve to the valve stem for turning movement, as will be readily understood. A double valve handle is provided for adjusting the valve, said handle comprising a body portion 30 slotted to engage the angular end 28 of the stem and adapted to be held in position thereon by the cotter pin 29, and from said body portion 30 extend handle members or levers 31 and 32 arranged at such an angle to each other that the handle 31 may be manipulated from the platform of the car, while the handle 32 extends downwardly and may be manipulated from the side of the car.

In practice, the valve may be employed at each end of a coach for connection with the ends of the train line or steam conducting pipe and the hose pipes coöperating therewith, and it will be seen that the valves may be adjusted to admit flow of the steam through the circuit for service action, and also for cutting off the flow of steam from coach to coach as conditions may require. The valve at the rear end of the coach of a train will, of course, be maintained in blank position, to prevent the escape of steam at that point. By the use of the valve in the manner described upon the coaches of a train it is evident that the pipes may be blown out for the discharge of the water of condensation at desired intervals, or by simply opening a valve at the center of the train the train line may be blown out from both ends through a single valve. By the use of a valve between the locomotive and tender a single valve may be employed for blow-out purposes, for the proper control of which a single employee, as the fireman of the engine, may be held responsible, thus insuring greater efficiency and reliability of control. The valves enable a train line to be quickly and conveniently drained of the water of condensation in a quick and convenient manner without liability of the train men scalding themselves, as is apt to happen in uncoupling hose connections for blow out purposes.

It will be observed that by the use of the V-shaped partition 13, the sides of which diverge in the direction of flow of the fluid, the column of fluid entering through the inlet 2 is divided into two columns of substantially equal pressures which, through the passages 14 and 15, exert substantially equal pressures on the valve 5, thus distributing the pressures so as to prevent the valve from binding. It will also be noted that the walls of the partition 19 diverge toward the outlet ends of the passages 17 and 18, thus tapering and constricting said passages, whereby free flow of the fluid into said passages through the cavities in the valve is insured, so that in the event of the arrangement of the valve as shown in Fig. 4 an efficient flow of steam to the passage 17 via the cavity 21, passage 16 and cavity 22 will be obtained.

I claim:—

1. A valve of the character described comprising a casing having an inlet at one side and a pair of outlets at its diametrically opposite side, and a rotary plug valve in said casing having cavities of relatively different sizes in its sides at a right angle to each other, said cavities being so arranged that by adjusting the valve to a certain position communication between the inlet and outlet ports will be cut off, by adjusting the valve to a second position communication may be established between the inlet and one of the outlets, and by adjusting the valve to a third position communication may be established between the inlet and the other outlet.

2. A valve of the character described comprising a casing having a vertical valve chamber, an inlet at one side of said chamber, outlets at the other side of the chamber, a partition dividing the inner portion of the inlet into branch passages, a partition separating the outlets from each other, a rotary valve in said chamber having side cavities arranged at a right angle to each other, one of said cavities being of greater size than the other, said valve being adjustable to one position to cut off communication between the inlet and outlets, to a second position to establish communication between one of the branch passages and one of the outlets through the valve cavity of larger size, while simultaneously establishing communication between the outlets through the valve cavity of smaller size, and to a third position to establish communication between the other branch channel and other outlet through the valve cavity of larger size.

3. A valve of the character described comprising a casing having an inlet at one end and a pair of longitudinally extending outlet passages at its opposite end, a valve chamber between said inlet and outlet passages and a rotary valve mounted in said chamber to control said passages, said valve having cavities in its sides at right angles to each other, said cavities being so arranged that the valve when turned to one position will cut off communication between the inlet and outlet passages, when turned to a second position will directly connect the inlet with one of said passages through one of said cavities and connect the two passages through the other cavity, and when turned to a third position will connect the inlet with one of said passages and blank the other passage.

4. A valve of the character described having an inlet at one end, longitudinally extending outlet passages at its opposite end, and an intervening valve chamber, a V-shaped partition separating the inlet end into two divisions; a partition separating the outlet passages and formed to constrict said passages in a discharge direction, and a rotary valve arranged in said valve chamber and provided with ports at right angles to each other for coöperation with said inlet and passages.

In testimony whereof I affix my signature in presence of two witnesses.

JOHN A. GOLLIHER.

Witnesses:
A. M. NUGENT,
C. P. WILLIAMS.

Copies of this patent may be obtained for five cents each, by addressing the "Commissioner of Patents, Washington, D. C."